US012516804B2

(12) United States Patent
Daily et al.

(10) Patent No.: US 12,516,804 B2
(45) Date of Patent: Jan. 6, 2026

(54) TWIST-LOCK LIGHT CONTROL MODULE FOR A LIGHT FIXTURE

(71) Applicant: TE Connectivity Solutions GmbH, Schaffhausen (CH)

(72) Inventors: Christopher George Daily, Harrisburg, PA (US); Matthew Edward Mostoller, Hummlestown, PA (US)

(73) Assignee: TE Connectivity Solutions GmbH, Schaffhausen (CH)

(*) Notice: Subject to any disclaimer, the term of this patent is extended or adjusted under 35 U.S.C. 154(b) by 353 days.

(21) Appl. No.: 18/162,197

(22) Filed: Jan. 31, 2023

(65) Prior Publication Data

US 2024/0255133 A1 Aug. 1, 2024

(51) Int. Cl.

| | |
|---|---|
| ***F21V 23/06*** | (2006.01) |
| ***F21V 23/04*** | (2006.01) |
| ***H01R 4/48*** | (2006.01) |
| ***H01R 13/639*** | (2006.01) |

(52) U.S. Cl.

CPC .......... *F21V 23/06* (2013.01); *F21V 23/0442* (2013.01); *H01R 4/48275* (2023.08); *H01R 13/639* (2013.01)

(58) Field of Classification Search

CPC .............................. F21V 23/06; H01R 4/4827

See application file for complete search history.

(56) References Cited

U.S. PATENT DOCUMENTS

| | | | | |
|---|---|---|---|---|
| 3,083,347 A * | 3/1963 | Fahey, Jr. | H01R 24/005 439/538 |
| 5,454,730 A * | 10/1995 | Tozuka | H01R 4/4821 439/441 |
| 7,004,781 B2 * | 2/2006 | Walter | H01R 4/4833 439/441 |
| 7,114,986 B1 * | 10/2006 | Toly | H01R 4/4828 439/441 |
| 7,175,469 B1 * | 2/2007 | Daily | H01R 4/48 439/441 |
| 8,864,514 B2 * | 10/2014 | Ilyes | H01R 24/38 439/337 |
| 9,373,899 B2 * | 6/2016 | Wu | H01R 4/48 |
| 10,330,301 B1 * | 6/2019 | Howard | H01R 13/245 |

(Continued)

FOREIGN PATENT DOCUMENTS

| | | |
|---|---|---|
| CN | 114784567 A | 7/2022 |
| WO | 2021229405 A1 | 11/2021 |

OTHER PUBLICATIONS

International Search Report, International App. No PCT/IB2024/050896 International Filing Date Jan. 31, 2024.

*Primary Examiner* — Neil Abrams

(57) ABSTRACT

A twist lock receptacle assembly includes a connector housing having power contact channels at a top and power wire openings at a bottom receiving poke-in power wires. The twist lock receptacle assembly includes twist-lock power contacts having rotate-to-mate interfaces connected to the sensor power contacts of a sensor module. The power contacts have wire termination pads electrically connected to the poke-in power wires when poked into the power wire openings and power contact wire pushers in the connector housing having spring beams configured to engage the poke-in power wires to mechanically and electrically connect the poke-in power wires to the wire termination pads.

19 Claims, 6 Drawing Sheets

(56) References Cited

U.S. PATENT DOCUMENTS

| | | | | |
|---|---|---|---|---|
| 11,187,404 | B2 * | 11/2021 | Howard | H01R 33/965 |
| 2006/0063419 | A1 * | 3/2006 | Steinkemper | H01R 4/4846 439/441 |
| 2024/0255133 | A1 * | 8/2024 | Daily | H01R 11/05 |

* cited by examiner

TWIST-LOCK LIGHT CONTROL MODULE FOR A LIGHT FIXTURE

BACKGROUND OF THE INVENTION

The subject matter herein relates generally to receptacle connectors for light fixtures.

On outdoor lighting, notably street lights and parking lot lights, sensor components and the corresponding mating receptacles are typically used to turn the lights on and off based upon the ambient light from the sun. The sensor components and the mating receptacles are mated at a rotate-to-mate interface using twist-lock power contacts. Some light fixtures support dimming to variably control the light fixture based on the ambient light levels, time of day, and the like. The light fixture includes a receptacle connector having a rotate-to-mate interface for the sensor module. Conventional receptacle connectors provide wires, crimped to ends of contacts in the receptacle connector, which are configured to be wired into the fixture. For example, the wires from the receptacle connector are spliced to other wires in the fixture, such as using wire nuts or other splicing techniques. Rewiring of the fixture is difficult. Repair or replacement of the wiring or other components typically involves removal of the entire receptacle connector and replacement of the receptacle connector with a new receptacle connector.

A need remains for a cost effective and reliable method of wiring a receptacle connector in a light fixture.

BRIEF DESCRIPTION OF THE INVENTION

In one embodiment, a twist lock receptacle assembly is provided and includes a connector housing having a sidewall between a top and a bottom of the connector housing. The connector housing has power contact channels open at the top to receive sensor power contacts of a sensor module. The connector housing includes power wire openings at the bottom associated with the power contact channels. The power wire openings configured to receive poke-in power wires. The twist lock receptacle assembly includes twist-lock power contacts received in the power contact channels. The twist-lock power contacts have rotate-to-mate interfaces at mating ends of the twist-lock power contacts configured to be connected to the sensor power contacts. The twist-lock power contacts include wire termination pads at terminating ends of the twist-lock power contacts configured to be electrically connected to the poke-in power wires when poked into the power wire openings. The twist lock receptacle assembly includes power contact wire pushers in the connector housing. The power contact wire pushers have spring beams configured to engage the poke-in power wires to mechanically and electrically connect the poke-in power wires to the wire termination pads.

In another embodiment, a twist lock receptacle assembly is provided and includes a connector housing having a sidewall between a top and a bottom of the connector housing. The connector housing has power contact channels open at the top to receive sensor power contacts of a sensor module. The connector housing includes power wire openings at the bottom associated with the power contact channels. The power wire openings configured to receive poke-in power wires. The connector housing has signal contact channels. The connector housing includes signal wire openings at the bottom associated with the signal contact channels. The signal wire openings configured to receive poke-in signal wires. The twist lock receptacle assembly includes twist-lock power contacts received in the power contact channels. The twist-lock power contacts have rotate-to-mate interfaces at mating ends of the twist-lock power contacts configured to be connected to the sensor power contacts. the twist-lock power contacts include wire termination pads at terminating ends of the twist-lock power contacts configured to be electrically connected to the poke-in power wires when poked into the power wire openings. The twist lock receptacle assembly includes power contact wire pushers in the connector housing. The power contact wire pushers have spring beams configured to engage the poke-in power wires to mechanically and electrically connect the poke-in power wires to the wire termination pads of the poke-in power contacts. The twist lock receptacle assembly includes signal contacts received in the signal contact channels. The signal contacts have mating interfaces at mating ends of the signal contacts configured to be connected to sensor signal contacts of the sensor module. The signal contacts include wire termination pads at terminating ends of the signal contacts configured to be electrically connected to the poke-in signal wires when poked into the signal wire openings. The twist lock receptacle assembly includes signal contact wire pushers in the connector housing. The signal contact wire pushers have spring beams configured to engage the poke-in signal wires to mechanically and electrically connect the poke-in signal wires to the wire termination pads of the signal contacts.

In a further embodiment, a light control module is provided and includes a sensor module having a sensor module housing and a sensor element held by the sensor module housing for sensing an environmental characteristic exterior of the sensor module. The sensor module includes twist-lock power contacts held by the sensor module housing and extending from a mating interface of the sensor module housing. The light control module includes a twist lock receptacle assembly coupled to the sensor module at the mating interface. The twist lock receptacle assembly includes a connector housing having a sidewall between a top and a bottom of the connector housing. The connector housing has power contact channels open at the top to receive sensor power contacts of a sensor module. The connector housing includes power wire openings at the bottom associated with the power contact channels. The power wire openings configured to receive poke-in power wires. The twist lock receptacle assembly includes twist-lock power contacts received in the power contact channels. The twist-lock power contacts have rotate-to-mate interfaces at mating ends of the twist-lock power contacts connected to the sensor power contacts. the twist-lock power contacts include wire termination pads at terminating ends of the twist-lock power contacts configured to be electrically connected to the poke-in power wires when poked into the power wire openings. The twist lock receptacle assembly includes power contact wire pushers in the connector housing. The power contact wire pushers have spring beams configured to engage the poke-in power wires to mechanically and electrically connect the poke-in power wires to the wire termination pads.

DETAILED DESCRIPTION OF THE INVENTION

Figure 1:
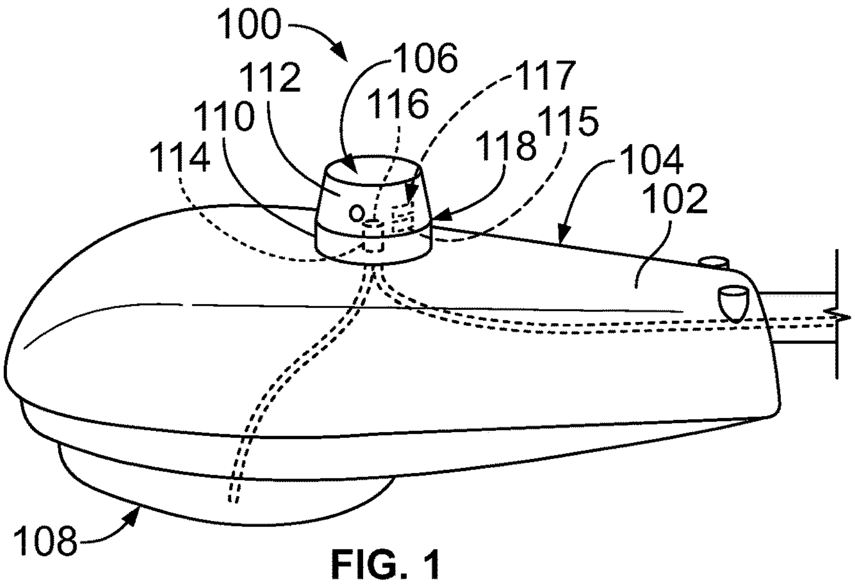
FIG. 1 illustrates a light control module formed in accordance with an exemplary embodiment.

FIG. 1 illustrates a light control module 100 formed in accordance with an exemplary embodiment. The light control module 100 is mounted to a fixture housing 102 of a light fixture 104, such as a roadway light, a parking lot light, a street light, and the like, or to another component, such as the pole or other structure supporting the light fixture 104, or to another component unassociated with the light fixture, such as a parking meter, a telephone pole or another structure. The light control module 100 holds a sensor module 106 that may be used for environmental monitoring or to control the light fixture 104, such as for turning a lighting element 108 of the light fixture 104 on or off depending upon light levels, for dimming control of the lighting element 108, or for controlling other functions. The lighting element 108 may be an LED lighting element in various embodiments.

The sensor module 106 may be used for other functions other than controlling the light fixture 104, such as remote monitoring of the environmental surroundings of the fixture housing 102, such as for parking monitoring, for street flow activity monitoring, or other functions. The sensor module 106 may be a photocell or light sensor used to detect ambient light from the sun. Other types of sensor components, such as object identification sensors, motion sensors, timing sensors or other types of environmental sensors may be included in the light control module 100.

The light control module 100 includes a receptacle connector 110 and the sensor module 106 includes a plug connector 112 coupled to the receptacle connector 110. In an exemplary embodiment, the connectors 110, 112 are twist-lock connectors and may be referred to hereinafter as twist-lock connectors 110, 112. The twist-lock connectors 110, 112 are mated at a rotate-to-mate interface. For example, the twist-lock connectors 110, 112 are initially mated in a plug mating direction along a mating axis and are finally mated in a rotate mating direction by rotating the twist lock connector 112 and/or the twist-lock connector 110 to lock the connectors 110, 112 together. In an exemplary embodiment, the receptacle connector 110 is a twist-lock photocontrol receptacle connector and the plug connector 112 is a twist-lock photocontrol plug connector, such as connectors being ANSI C136.x compliant.

The receptacle connector 110 forms the bottom of the light control module 100. The receptacle connector 110 may be directly mounted to the fixture housing 102 of the light fixture 104. The sensor module 106 forms the top of the light control module 100. For example, the sensor module 106 houses or surrounds a sensor component, such as to provide environmental protection for the sensor component.

In an exemplary embodiment, power and data may be transmitted between the plug connector 112 of the sensor module 106 and the receptacle connector 110 across the mating interface 118. The connectors 110, 112 include power contacts 114, 116 (shown in phantom in FIG. 2) and signal contacts 115, 117 at a mating interface 118. The power contacts 114, 116 may be twist-lock power contacts. The power contacts 114, 116 may be high voltage power contacts. The signal contacts 115, 117 may be low speed data contacts for transmitting low speed data signals across the mating interface 118. For example, control signals may be transmitted by the low speed signal contacts 115, 117 from the plug connector 112 to the receptacle connector 110 for controlling operation of the light fixture 104. The control signals may be based on sensor data gathered by the sensor module 106.

Figure 2:
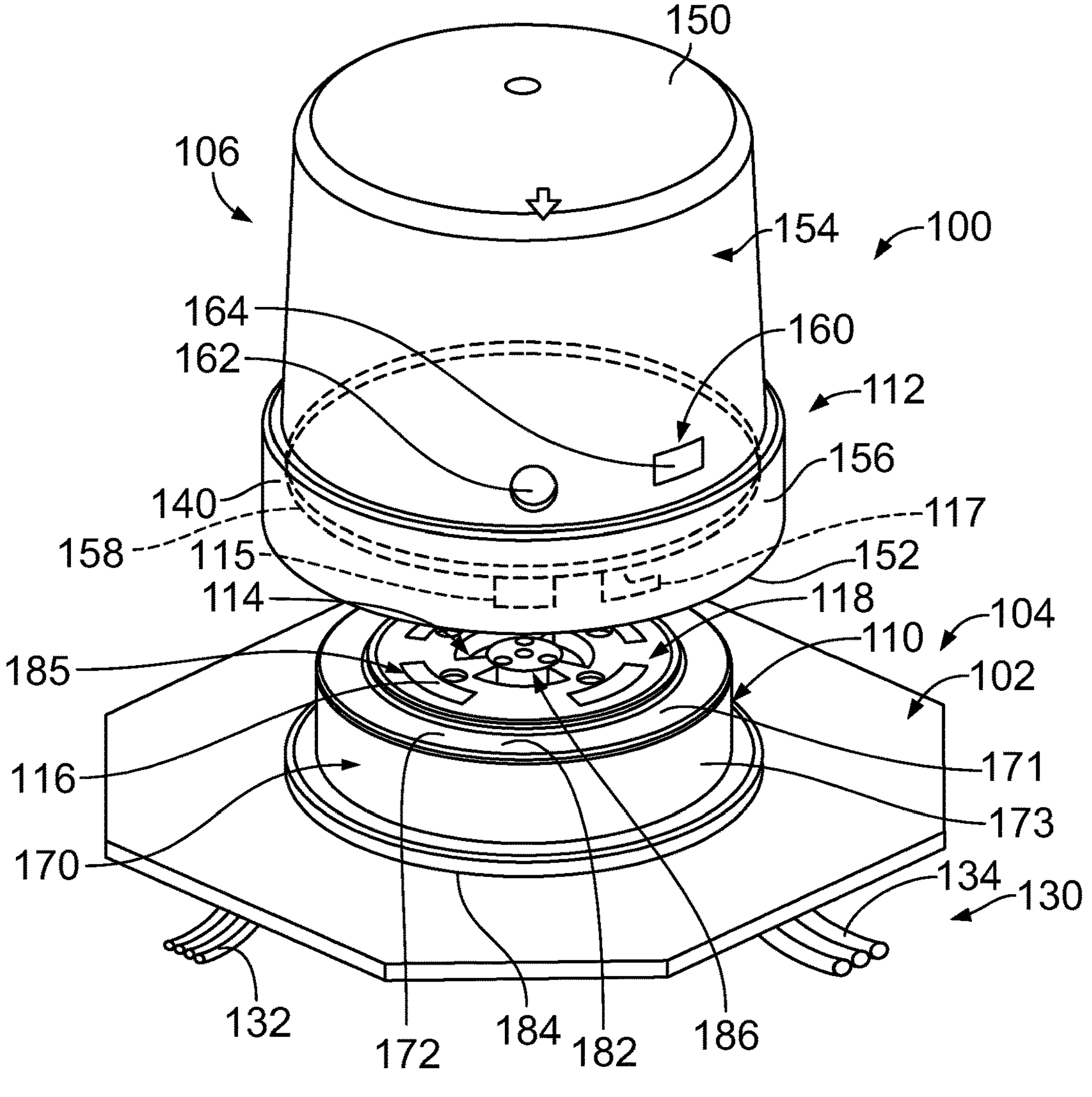
FIG. 2 is an exploded perspective view of the light control module in accordance with an exemplary embodiment showing the plug connector of the sensor module poised for mating with the receptacle connector.

FIG. 2 is an exploded perspective view of the light control module 100 in accordance with an exemplary embodiment showing the plug connector 112 of the sensor module 106 poised for mating with the receptacle connector 110. The connectors 110, 112 hold the power contacts 114, 116 and the signal contacts 115, 117. Optionally, a seal (not shown) may be provided between the receptacle connector 110 and the plug connector 112 to seal the light control module 100 at the mating interface 118 from environmental containments such as water, debris, and the like.

In an exemplary embodiment, the light control module 100 includes a wire harness 130 coupled to the receptacle connector 110. The wire harness 130 includes signal wires 132 and power wires 134. In an exemplary embodiment, the signal wires 132 are poke-in signal wires 132. The signal wires 132 are configured to be coupled with corresponding signal contacts 115, such as after the receptacle connector 110 is mounted to the fixture housing 102. The poke-in signal wires 132 are releasable from the signal contacts 115, such as for repair, replacement, or rewiring of the light control module 100. The signal wires 132 may transmit data to or from the receptacle connector 110 for data communication with the plug connector 112. For example, control signals for controlling operation of the light fixture 104, such as ON/OFF or dimming signals, may be transmitted from the plug connector 112 to the receptacle connector 110. The signal wires 132 may be connected to a light driver for the light fixture 104. In other embodiments, the signal wires 132 may be electrically connected to another component, such as a video camera, to transmit video signals.

In an exemplary embodiment, the power wires 134 are poke-in power wires 134. The power wires 134 are terminated to corresponding power contacts 114, such as after the receptacle connector 110 is mounted to the fixture housing 102. The poke-in power wires 134 are releasable from the power contacts 114, such as for repair, replacement, or rewiring of the light control module 100. The wire harness 130 may be installed in the field, such as when installed in the light fixture 104. The power wires 134 may be power in or power out wires bringing power to the light control module 100 from a power source or bringing power from the power contacts 114 to another component, such as the lighting element 108 or a driver board for the lighting element of the light fixture 104. In various embodiments, the power wires 134 may include a line wire, a load wire, a neutral wire or other types of wires.

The receptacle connector 110 includes a connector housing 170 having a base 172 extending between a top 182 and a bottom 184 and a rear cover 176 coupled to the base 172 at the bottom 184. The connector housing 170 includes an end wall 171 at the top 182 and a side wall 173 extending between the top 182 and the bottom 184. The end wall 171 defines the mating interface with the sensor module 106. The bottom 184 of the base 172 is configured to be secured to the fixture housing 102.

The connector housing 170 holds the power contacts 114 and signal contacts 115. The signal contacts 115 are received in signal contact channels 185 and extend to the top 182 for interfacing with the plug connector 112. The poke-in signal wires 132 may be plugged into the connector housing 170, such as into the rear cover 176, for termination to the signal contacts 115. The power contacts 114 are held in power contact channels 186 within the base 172. Optionally, the power contacts 114 may be entirely contained within the base 172 and protected from the environment by the base 172. The poke-in power wires 134 may be plugged into the connector housing 170, such as into the rear cover 176, for termination to the power contacts 114. Optionally, the contact channels 186 include arcuate or curved slots or openings in the base 172 for twist-lock mating with the sensor contacts.

In an exemplary embodiment, the receptacle connector 110 is generally cylindrical shaped, such as to allow easy rotation of the plug connector 112 relative to the receptacle connector 110 and/or to allow easy rotation of the receptacle connector 110 relative to the fixture housing 102. However, the receptacle connector 110 may have other shapes and alternative embodiments. In an exemplary embodiment, the plug connector 112 may be rotatable relative to the receptacle connector 110, such as to allow rotating mating of the plug connector 112 with the receptacle connector 110.

The sensor module 106 includes a sensor module housing 140 extending between a top 150 and a bottom 152. The sensor module housing 140 has a mating interface at the bottom 152 configured to be secured to the receptacle connector 110. In an exemplary embodiment, the sensor module 106 includes a sensor lid 154 at the top 150 of the housing 140 and a base 156 at the bottom 152. The sensor lid 154 may include a dome configured to circumferentially surrounding the base 156 of the sensor module 106. Sensor components 160 are arranged in the sensor lid 154. In an exemplary embodiment, the sensor module 106 is cylindrical shaped, such as to allow easy rotation of the sensor module 106 relative to the receptacle connector 110, such as during mating. However, the sensor module 106 may have other shapes and alternative embodiments.

In an exemplary embodiment, a circuit board 158 (shown in phantom) is arranged in the base 156 and/or the sensor lid 154. The sensor component(s) 160 may be coupled to the circuit board 158, such as being mounted to the circuit board 158. Other components may be mounted to the circuit board 158. For example, a control module and/or communication device may be mounted to the circuit board 158.

The sensor power contacts 116 (shown in phantom) are held by the housing 140, such as being held by the base 156. The sensor power contacts 116 may be terminated to the circuit board 158. The sensor power contacts 116 extend from the bottom 152 of the sensor module 106 for mating with the power contacts 114. The sensor power contacts 116 may be arranged generally around a central axis. Optionally, the sensor power contacts 116 may be twist lock contacts. For example, the sensor power contacts 116 may be curved and fit in the curved contact channels 186 in the receptacle connector 110 to mate with corresponding curved power contacts 114. In an exemplary embodiment, the sensor module 106 may be twisted or rotated to lock the sensor power contacts 116 in the receptacle connector 110, such as in electrical contact with the power contacts 114. For example, the sensor power contacts 116 may be twist-lock contacts that are initially loaded into the contact channels 186 in a vertical direction and the sensor module 106 is then rotated, such as approximately 35 degrees, to lock the sensor power contacts 116 in the receptacle connector 110. Other types of mating arrangements between the sensor power contacts 116 and the power contacts 114 of the receptacle connector 110 are possible in alternative embodiments.

The sensor signal contacts 117 (shown in phantom) may be held by the sensor module housing 140, such as being held by the base 156. The sensor signal contacts 117 may be terminated to the circuit board 158. The sensor signal contacts 117 may extend from the bottom 152 of the sensor module 106 for mating with the signal contacts 115. The sensor signal contacts 117 may be arranged generally around a central axis. Optionally, the sensor signal contacts 117 may be spring beam contacts; however, the sensor signal contacts 117 may be other types of contacts.

In an exemplary embodiment, the plug connector 112 includes different types of environmental sensor components 160 for sensing different events. For example, the sensor module 106 includes a photocell 162. The photocell 162 is used for sensing ambient light and is used to control operation of the light fixture 104, such as for turning the light fixture 104 on or off depending upon light levels or for dimming control of the light fixture 104. Optionally, the photocell 162 may be mounted to the circuit board 158 and/or the sensor lid 154. The sensor signal contacts 117 and the photocell 162 may be electrically connected via the circuit board 158. The circuit board 158 may include additional componentry for signal conditioning. For example, the circuit board 158 may have control circuitry for controlling operation of the light fixture 104, such as including a daylight or nighttime control circuit, a timer circuit, a dimming circuit, and the like. Data from the photocell 162 may be transmitted through the signal contacts across the mating interface 118.

In an exemplary embodiment, the sensor module 106 includes one or more other environmental sensors 164 for sensing an environmental characteristic other than ambient light exterior of the plug connector 112 in the environment exterior of the sensor module 106. For example, the sensor 164 may be a motion sensor or an object sensor configured to sense movement or presence of an object, such as a person or vehicle in a particular area. The sensor 164 may be used for parking monitoring, for street flow activity monitoring, for pedestrian monitoring, or other functions. The sensor 164 may be mounted to the circuit board 158. In an exemplary embodiment, the sensor 164 is electrically connected to the sensor signal contacts 117 via the circuit board 158.

Figure 3:
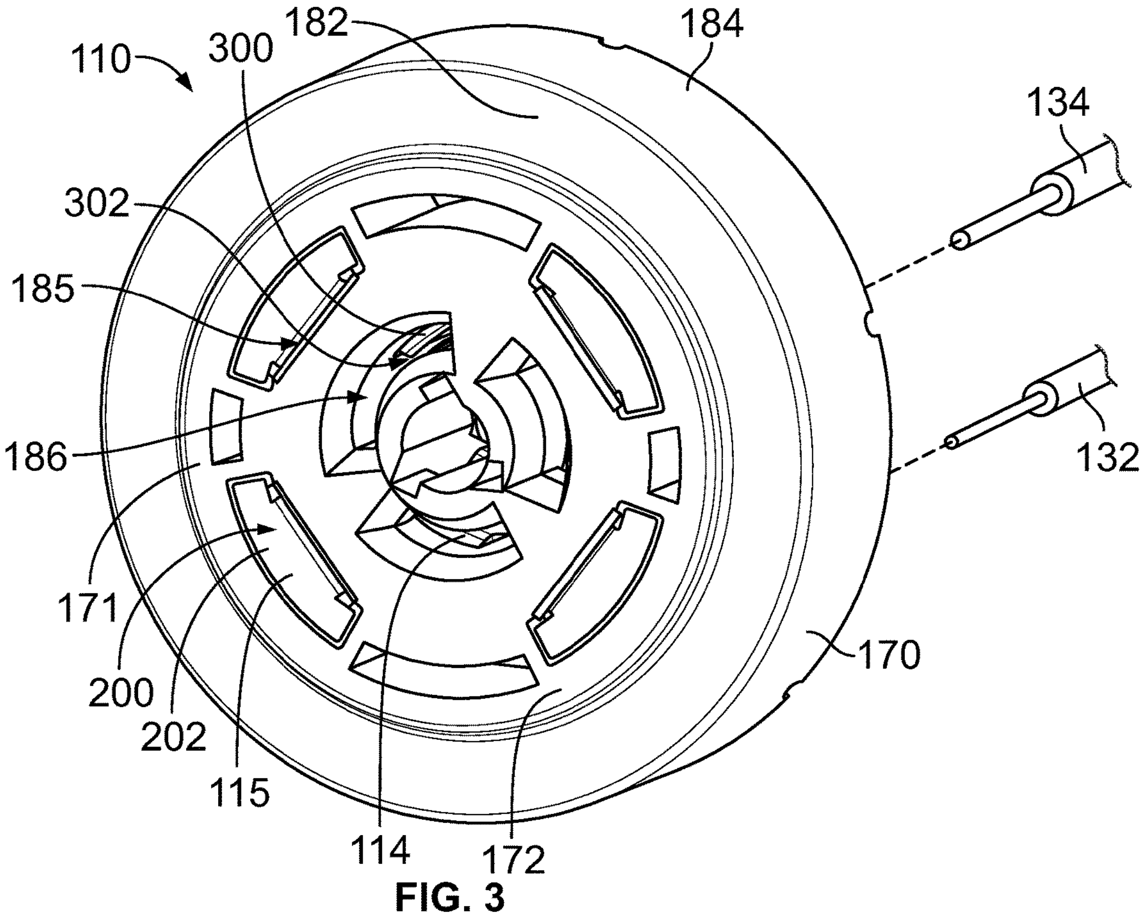
FIG. 3 is a front perspective view of the receptacle connector in accordance with an exemplary embodiment.
Figure 4:
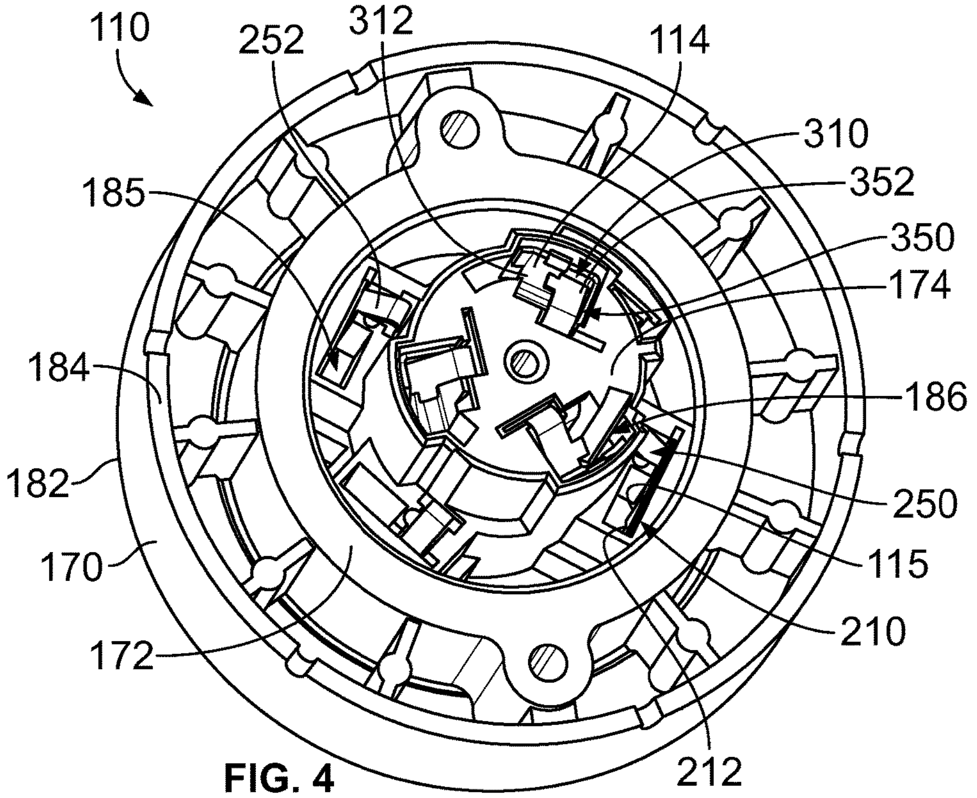
FIG. 4 is a rear perspective view of the receptacle connector in accordance with an exemplary embodiment.

FIG. 3 is a front perspective view of the receptacle connector 110 in accordance with an exemplary embodiment. FIG. 4 is a rear perspective view of the receptacle connector 110 in accordance with an exemplary embodiment. The receptacle connector 110 includes the connector housing 170, which includes the base 172 (the rear cover 176 is removed in FIG. 4 to illustrate the rear end of the base 172). The end wall 171 at the top of the base 172 defines the mating interface for mating with the sensor module 106 (FIG. 2).

The connector housing 170 holds the power contacts 114 in the power contact channels 186 and the signal contacts 115 in the signal contact channels 185. In an exemplary embodiment, the receptacle connector housing 170 includes a central hub 174 (FIG. 4) extending from the bottom 184 of the base 172. The contact channels 186 extend through the base 172 and the hub 174. The signal contact channels 185 surround the hub 174.

Each signal contact 115 extends between a mating end 200 (FIG. 3) and a terminating end 210 (FIG. 4). In the illustrated embodiment, the signal contact 115 includes a contact pad 202 at the mating end 200. The contact pad 202 defines a mating interface for mating with the sensor signal contact 117 (FIG. 2). Optionally, the contact pad 202 is flat and exposed at the top 182 of the receptacle connector housing 170. The signal contacts 115 may include alternative mating interfaces in alternative embodiments, such as spring beams, pins, sockets, and the like.

In an exemplary embodiment, the terminating end 210 includes a wire termination pad 212. The wire termination pad 212 is configured to receive the poke-in signal wire 132. For example, the poke-in signal wire 132 may be pressed against the wire termination pad 212 to electrically connect to the signal contact 115. In an exemplary embodiment, the wire termination pad 212 forms a separable mating interface allowing the poke-in signal wire 132 to separate from or release from the wire termination pad 212. In an exemplary embodiment, the receptacle connector 110 includes signal contact wire pushers 250 in the connector housing 170. The signal contact wire pushers 250 are used to hold the poke-in signal wires 132 in electrical connection with the wire termination pad 212. In an exemplary embodiment, each signal contact wire pusher 250 includes a spring beam 252 configured to press against the poke-in signal wire 132. The spring beam 252 is deflectable and is configured to be released from the poke-in signal wire 132 to allow removal of the poke-in signal wire 132 from the receptacle connector 110.

In the illustrated embodiment, four signal contacts 115 are provided spaced generally equidistant apart from each other. Greater or fewer signal contacts 115 may be provided in alternative embodiments. The signal contacts 115 may be arranged at other locations in alternative embodiments.

Each power contact 114 extends between a mating end 300 (FIG. 3) and a terminating end 310 (FIG. 4). In the illustrated embodiment, the power contact 114 includes a socket 302 at the mating end 300. The socket 302 may be curved to receive the curved sensor power contact 116. The socket 302 is a twist lock mating interface configured to be mated with the sensor power contact 116 by a twist-to-lock mating operation. The power contacts 114 may include alternative mating interfaces in alternative embodiments, such as pads, spring beams, pins, and the like.

In an exemplary embodiment, the terminating end 310 includes a wire termination pad 312. The wire termination pad 312 is configured to receive the poke-in power wire 134. For example, the poke-in power wire 134 may be pressed against the wire termination pad 312 to electrically connect to the power contact 114. In an exemplary embodiment, the wire termination pad 312 forms a separable mating interface allowing the poke-in power wire 134 to separate from or release from the wire termination pad 312. In an exemplary embodiment, the receptacle connector 110 includes power contact wire pushers 350 in the connector housing 170. The power contact wire pushers 350 are used to hold the poke-in power wires 134 in electrical connection with the wire termination pad 312. In an exemplary embodiment, each power contact wire pusher 350 includes a spring beam 352 configured to press against the poke-in power wire 134. The spring beam 352 is deflectable and is configured to be released from the poke-in power wire 134 to allow removal of the poke-in power wire 134 from the receptacle connector 110.

In the illustrated embodiment, three power contacts 114 are provided spaced generally equidistant apart from each other. Greater or fewer power contacts 114 may be provided in alternative embodiments. The power contacts 114 may be arranged at other locations in alternative embodiments.

Figure 5:
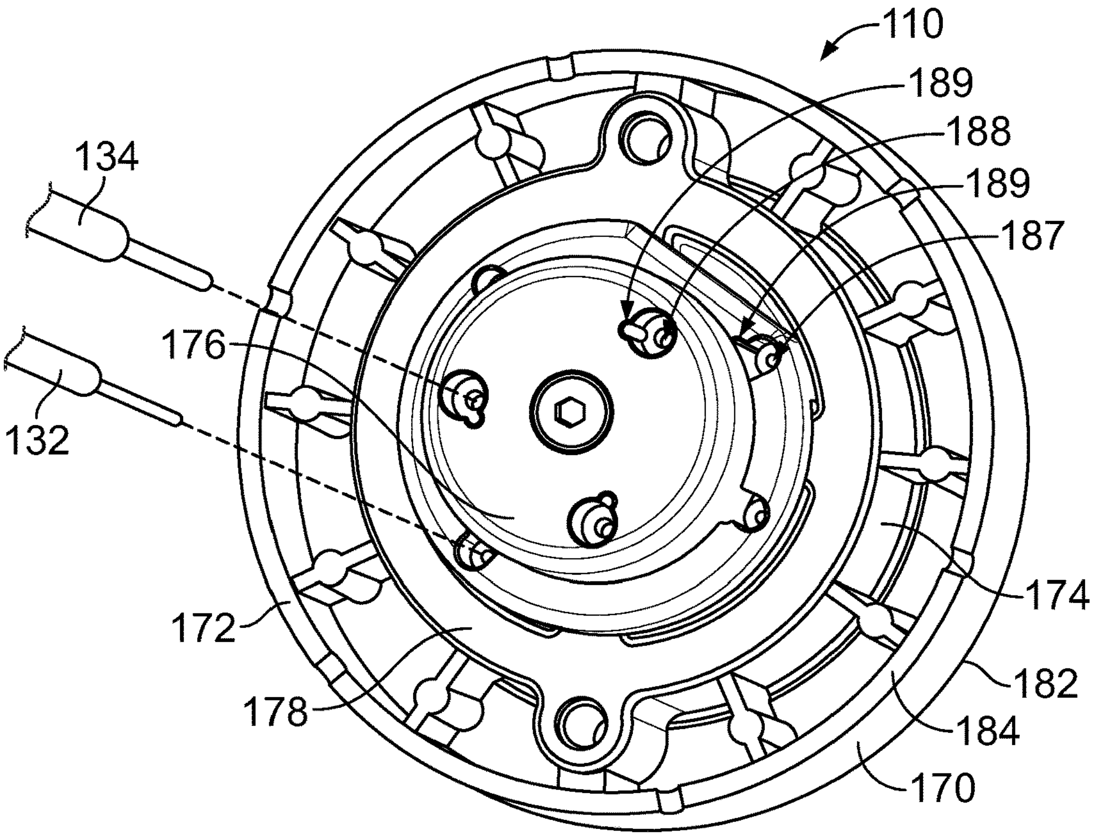
FIG. 5 is a rear perspective view of the receptacle connector in accordance with an exemplary embodiment.
Figure 6:
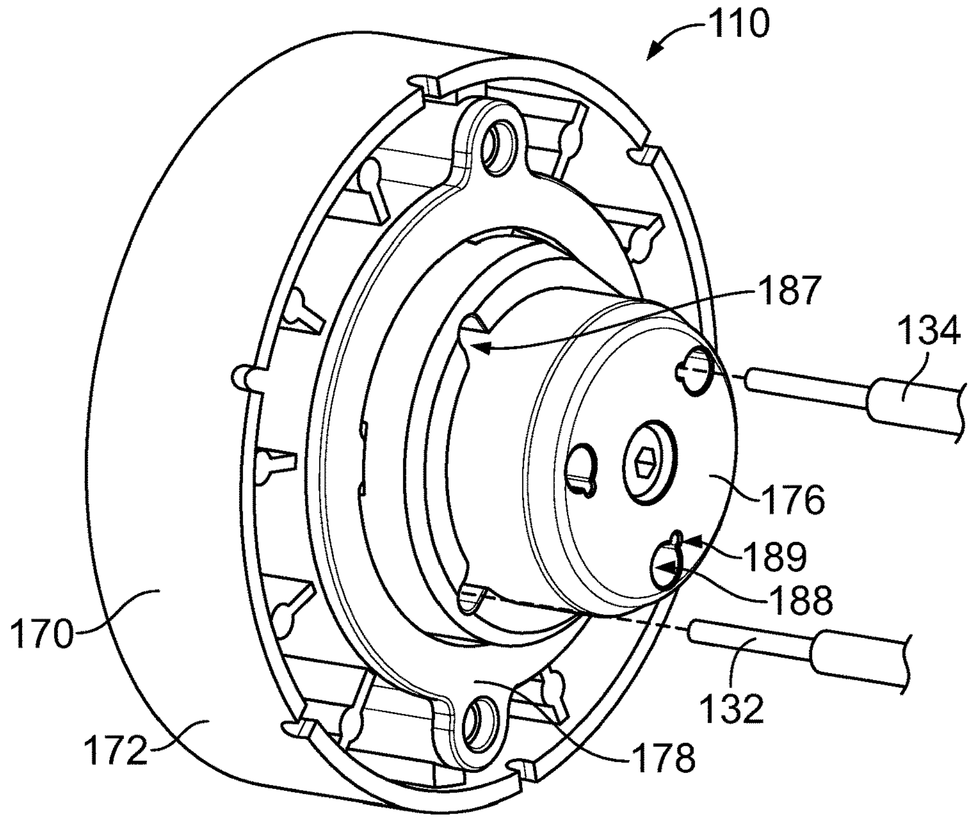
FIG. 6 is a rear perspective view of the receptacle connector in accordance with an exemplary embodiment showing one of the poke-in power wires and one of the poke-in signal wires poised for loading into the receptacle connector.

FIG. 5 is a rear perspective view of the receptacle connector 110 in accordance with an exemplary embodiment. FIG. 6 is a rear perspective view of the receptacle connector 110 in accordance with an exemplary embodiment showing one of the poke-in power wires 134 and one of the poke-in signal wires 132 poised for loading into the receptacle connector 110.

The receptacle connector 110 includes the connector housing 170, which includes the base 172 and the rear cover 176 coupled to the rear end of the base 172. In an exemplary embodiment, a gasket 178 is coupled to the base 172 and/or the rear cover 176. The gasket 178 may be sealed to the fixture housing 102 (shown in FIG. 1). The rear cover 176 covers the power contacts 114 in the power contact channels 186 and the signal contacts 115 in the signal contact channels 185 (both shown in FIG. 4).

In an exemplary embodiment, the rear cover 176 includes power wire openings 188 providing access to the power contact channels 186 and signal wire openings 187 providing access to the signal contact channels 185. The power wire openings 188 receive the poke-in power wires 134. The power wire openings 188 may be shaped to guide the poke-in power wires 134 into connection with the power contacts 114. Optionally, multiple power wire openings 188 may be provided for each power contact channel 186 to receive multiple wires, such as for daisy chaining the power wires 134. In an exemplary embodiment, the rear cover 176 includes release openings 189 that receive a release tool to release the poke-in power wires 134 from the receptacle connector 110. The signal wire openings 187 receive the poke-in signal wires 132. The power wire openings 188 may be shaped to guide the poke-in signal wires 132 into connection with the signal contacts 115. In an exemplary embodiment, the rear cover 176 includes release openings 189 that receive a release tool to release the poke-in signal wires 132 from the receptacle connector 110.

The connector housing 170 holds the power contacts 114 in the power contact channels 186 and the signal contacts 115 in the signal contact channels 185. In an exemplary embodiment, the receptacle connector housing 170 includes a central hub 174 (FIG. 4) extending from the bottom 184 of the base 172. The contact channels 186 extend through the base 172 and the hub 174. The signal contact channels 185 surround the hub 174.

Figure 7:
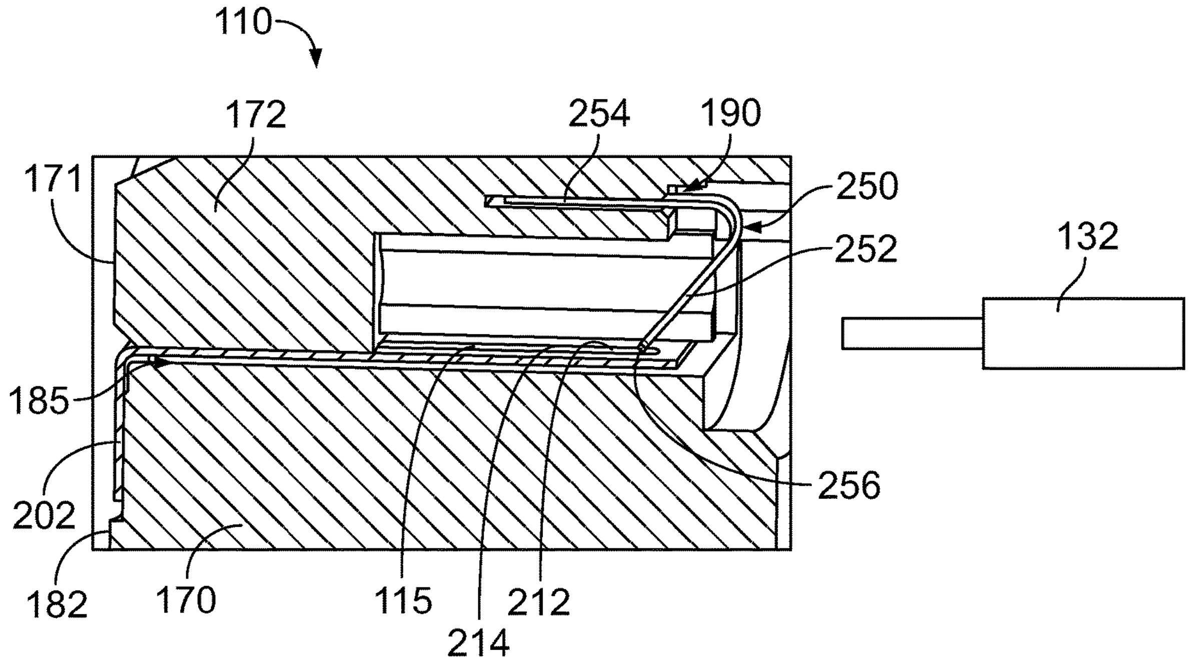
FIG. 7 is a cross sectional view of a portion of the receptacle connector in accordance with an exemplary embodiment showing one of the signal contacts arranged within the connector housing.

FIG. 7 is a cross sectional view of a portion of the receptacle connector 110 in accordance with an exemplary embodiment showing one of the signal contacts 115 arranged within the connector housing 170. The signal contact 115 is received in the signal contact channel 185. The signal contact wire pusher 250 extends into the signal contact channel 185 adjacent to the wire termination pad 212. The poke-in signal wire 132 is configured to be positioned between the spring beam 252 of the signal contact wire pusher 250 and the wire termination pad 212.

In the illustrated embodiment, the contact pad 202 of the signal contact 115 extends along the end wall 171 of the base 172. Optionally, the contact pad 202 is flat and exposed at the top 182 of the receptacle connector housing 170. The wire termination pad 212 is located in the base 172, such as in the signal contact channel 185. In an exemplary embodiment, the wire termination pad 212 includes an embossment 214 or other feature to locate the poke-in signal wire 132 relative to the wire termination pad 212. The embossment 214 may increase the surface area of the signal contact 115 in electrical contact with the poke-in signal wire 132.

In an exemplary embodiment, the signal contact wire pusher 250 is used to hold the poke-in signal wire 132 in electrical connection with the wire termination pad 212. For example, the spring beam 252 is configured to press against the poke-in signal wire 132 to hold the poke-in signal wire 132 in electrical connection with the wire termination pad 212. In an exemplary embodiment, the signal contact wire pusher 250 is separate and discrete from the signal contact 115. The signal contact wire pusher 250 may be manufactured from a different material than the signal contact 115. For example, the signal contact wire pusher 250 may be manufactured from a material having high spring characteristics, whereas the signal contact 115 may be manufactured from a material having high electrical conductivity. In various embodiments, the signal contact wire pusher 250 may be manufactured from a stainless steel material and the signal contact 115 may be manufactured form a copper material. The signal contact wire pusher 250 and the signal contact 115 may have different thicknesses, such as being stamped from different gauge metal sheets. In an exemplary embodiment, a base 254 of the signal contact wire pusher 250 is received in a pusher channel 190. The spring beam 252 extends from the base 254 into the signal contact channel 185. An edge 256 of the signal contact wire pusher 250, such as at a distal end of the spring beam 252, is configured to hold the poke-in signal wire 132 in the signal contact channel 185. The spring beam 252 is configured to be released from the poke-in signal wire 132 to allow removal of the poke-in signal wire 132 from the receptacle connector 110. In an alternative embodiment, the signal contact wire pusher 250 may be integral with the signal contact 115, such as being stamped and formed with the signal contact 115.

Figure 8:
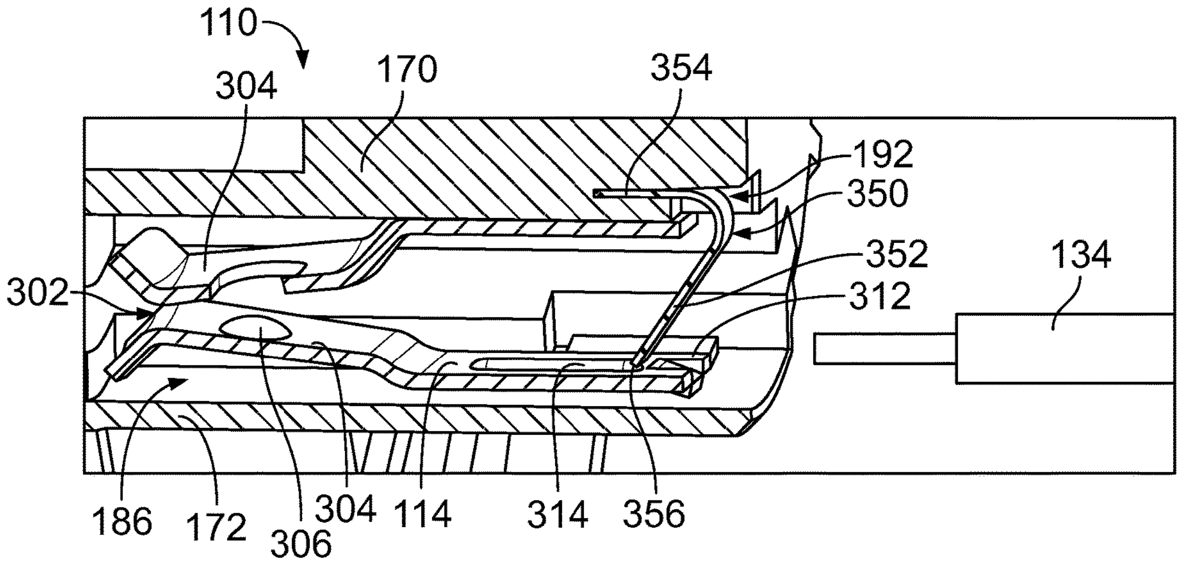
FIG. 8 is a cross sectional view of a portion of the receptacle connector in accordance with an exemplary embodiment showing one of the power contacts arranged within the connector housing.

FIG. 8 is a cross sectional view of a portion of the receptacle connector 110 in accordance with an exemplary embodiment showing one of the power contacts 114 arranged within the connector housing 170. The power contact 114 is received in the power contact channel 186. The power contact wire pusher 350 extends into the power contact channel 186 adjacent to the wire termination pad 312. The poke-in power wire 134 is configured to be positioned between the spring beam 352 of the power contact wire pusher 350 and the wire termination pad 312.

In the illustrated embodiment, the power contact 114 includes mating beams 304 defining the socket 302. The mating beams 304 are located in the power contact channel 186 to receive the sensor power contact 116 (shown in FIG. 2). In various embodiments, the mating beams 304 are curved along arcuate paths to form a curved socket 302 to receive the curved poke-in power contact 116. The mating beams 304 may include dimples 306 or other features to interface with the sensor power contact 116. The wire termination pad 312 is located in the base 172, such as in the power contact channel 186. In an exemplary embodiment, the wire termination pad 312 includes an embossment 314 or other feature to locate the poke-in power wire 134 relative to the wire termination pad 312. The embossment 314 may increase the surface area of the power contact 114 in electrical contact with the poke-in power wire 134.

In an exemplary embodiment, the power contact wire pusher 350 is used to hold the poke-in power wire 134 in electrical connection with the wire termination pad 312. For example, the spring beam 352 is configured to press against the poke-in power wire 134 to hold the poke-in power wire 134 in electrical connection with the wire termination pad 312. In an exemplary embodiment, the power contact wire pusher 350 is separate and discrete from the power contact 114. The power contact wire pusher 350 may be manufactured from a different material than the power contact 114. For example, the power contact wire pusher 350 may be manufactured from a material having high spring characteristics, whereas the power contact 114 may be manufactured from a material having high electrical conductivity. In various embodiments, the power contact wire pusher 350 may be manufactured from a stainless steel material and the power contact 114 may be manufactured form a copper material. The power contact wire pusher 350 and the power contact 114 may have different thicknesses, such as being stamped from different gauge metal sheets. In an exemplary embodiment, a base 354 of the power contact wire pusher 350 is received in a pusher channel 192. The spring beam 352 extends from the base 354 into the power contact channel 186. An edge 356 of the power contact wire pusher 350, such as at a distal end of the spring beam 352, is configured to hold the poke-in power wire 134 in the power contact channel 186. The spring beam 352 is configured to be released from the poke-in power wire 134 to allow removal of the poke-in power wire 134 from the receptacle connector 110. In an alternative embodiment, the power contact wire pusher 350 may be integral with the power contact 114, such as being stamped and formed with the power contact 114.

Figure 9:
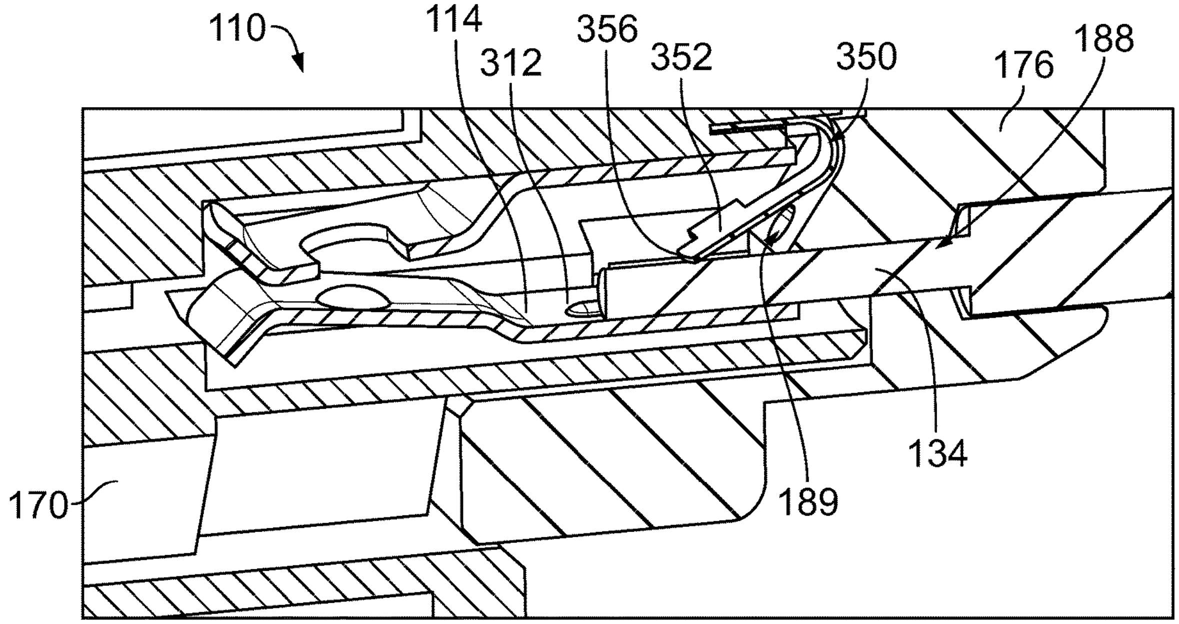
FIG. 9 is a cross sectional view of a portion of the receptacle connector in accordance with an exemplary embodiment showing the poke-in power wire coupled to the power contacts.
Figure 10:
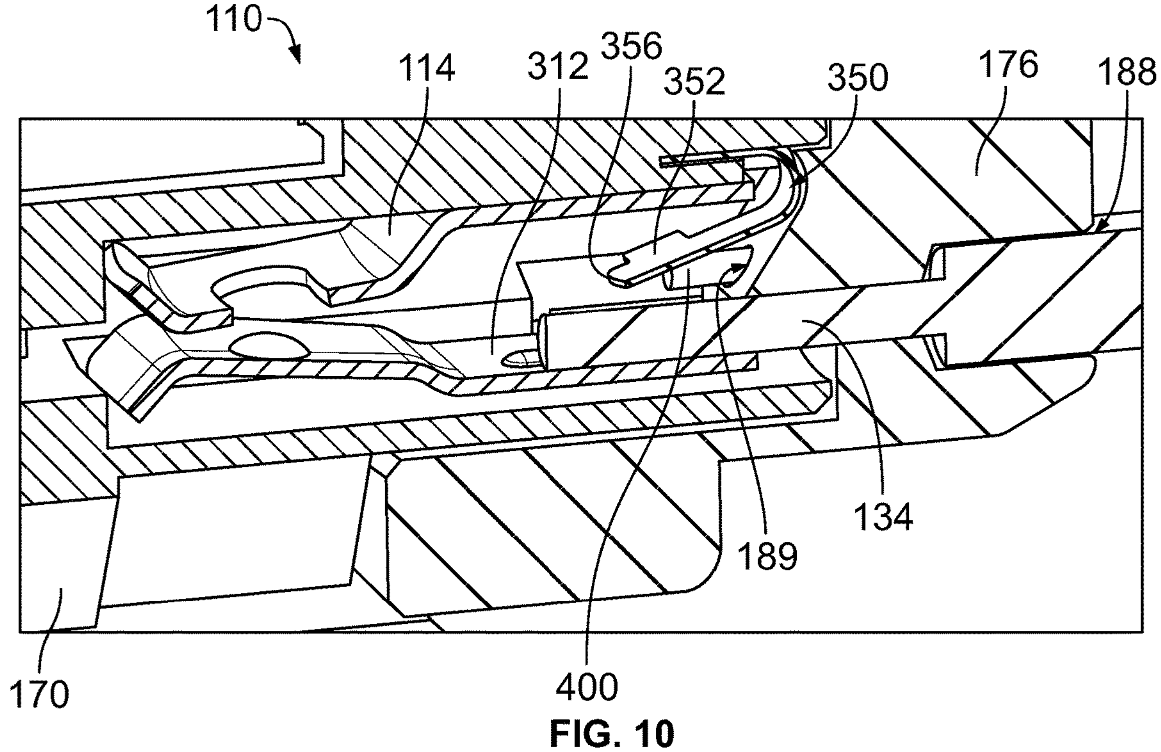
FIG. 10 is a cross sectional view of a portion of the receptacle connector in accordance with an exemplary embodiment showing the poke-in power wire released from the power contacts.

FIG. 9 is a cross sectional view of a portion of the receptacle connector 110 in accordance with an exemplary embodiment showing the poke-in power wire 134 coupled to the power contacts 114. FIG. 10 is a cross sectional view of a portion of the receptacle connector 110 in accordance with an exemplary embodiment showing the poke-in power wire 134 released from the power contacts 114.

During assembly, the poke-in power wire 134 is plugged into the power wire opening 188 in the connector housing 170, such as in the rear cover 176. The poke-in power wire 134 is plugged into the space between the wire termination pad 312 and the spring beam 352 of the power contact wire pusher 350. The spring beam 352 holds the poke-in power wire 134 in electrical connection with the wire termination pad 312. The edge 356 of the spring beam 352 engages the poke-in power wire 134 to retain the poke-in power wire 134 in the receptacle connector 110. The edge 356 of the spring beam 352 resists pull out of the poke-in power wire 134 from the power wire opening 188.

The spring beam 352 is configured to be released from the poke-in power wire 134 to allow removal of the poke-in power wire 134 from the receptacle connector 110. A release tool 400 may be plugged into the release opening 189 to release the spring beam 352 from the poke-in power wires 134. When the spring beam 352 is released, the poke-in power wire 134 may be separated from the wire termination pad 312 and removed from the connector housing 170.

Figure 11:
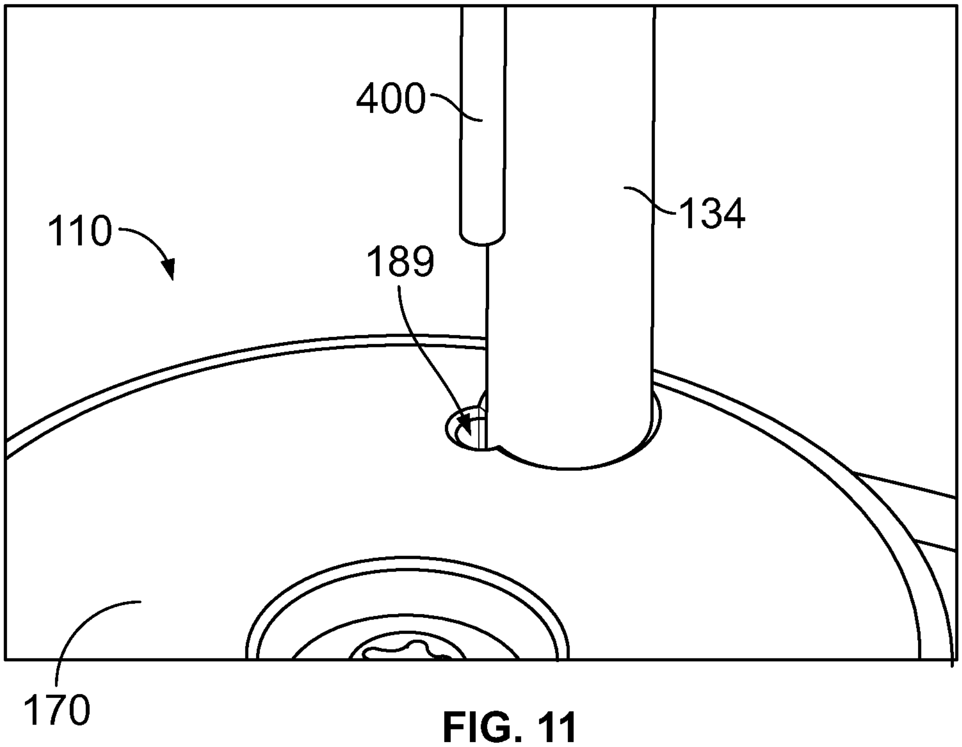
FIG. 11 is a rear perspective view of a portion of the receptacle connector in accordance with an exemplary embodiment showing the release tool poised for loading into the connector housing.
Figure 12:
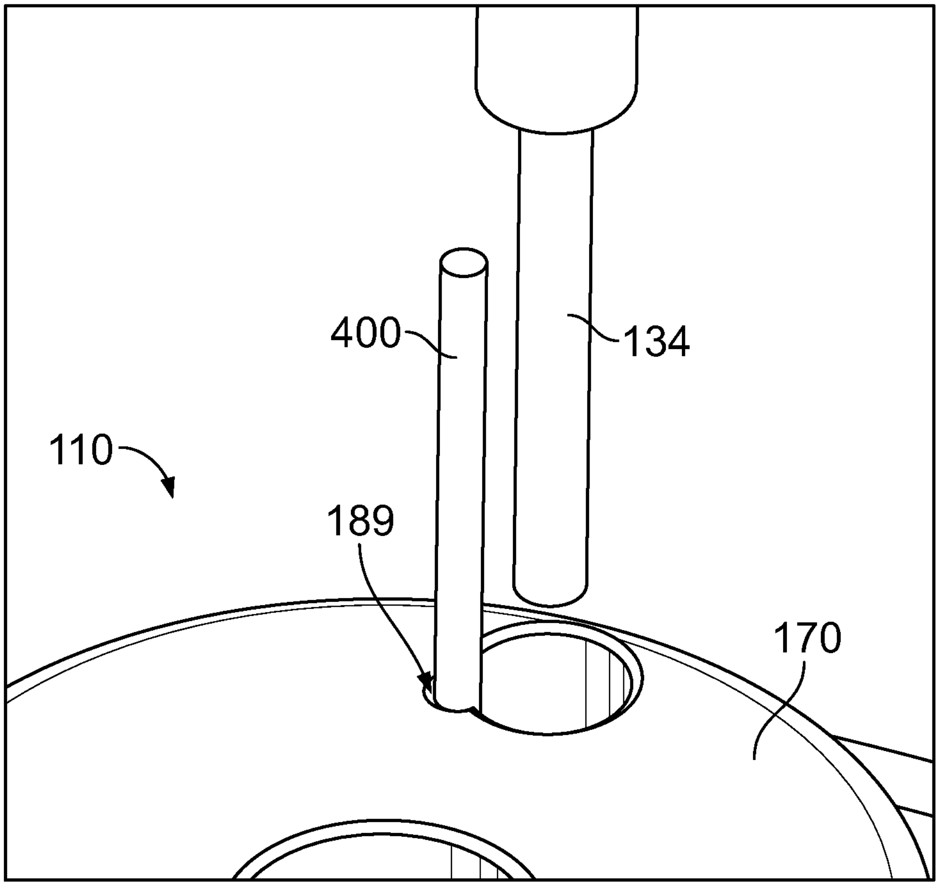
FIG. 12 is a rear perspective view of a portion of the receptacle connector in accordance with an exemplary embodiment showing the release tool loaded into the connector housing to release the poke-in power wire.

FIG. 11 is a rear perspective view of a portion of the receptacle connector 110 in accordance with an exemplary embodiment showing the release tool 400 poised for loading into the connector housing 170. FIG. 12 is a rear perspective view of a portion of the receptacle connector 110 in accordance with an exemplary embodiment showing the release tool 400 loaded into the connector housing 170 to release the poke-in power wire 134.

The release tool 400 may be a pin or other small device configured to be plugged into the release opening 189. The release tool 400 is pressed into the release opening 189 to engage the spring beam 352 of the power contact wire pusher 350 and release the spring beam 352 from the poke-in power wires 134. When the spring beam 352 is released, the poke-in power wire 134 may be removed from the connector housing 170, such as for repair, replacement, or rewiring of the receptacle connector 110.

It is to be understood that the above description is intended to be illustrative, and not restrictive. For example, the above-described embodiments (and/or aspects thereof) may be used in combination with each other. In addition, many modifications may be made to adapt a particular situation or material to the teachings of the invention without departing from its scope. Dimensions, types of materials, orientations of the various components, and the number and positions of the various components described herein are intended to define parameters of certain embodiments, and are by no means limiting and are merely exemplary embodiments. Many other embodiments and modifications within the spirit and scope of the claims will be apparent to those of skill in the art upon reviewing the above description. The scope of the invention should, therefore, be determined with reference to the appended claims, along with the full scope of equivalents to which such claims are entitled. In the appended claims, the terms "including" and "in which" are used as the plain-English equivalents of the respective terms "comprising" and "wherein." Moreover, in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

What is claimed is:

1. A twist lock receptacle assembly comprising:

a connector housing having a sidewall between a top and a bottom of the connector housing, the connector housing having power contact channels open at the top to receive sensor power contacts of a sensor module, the connector housing including power wire openings at the bottom associated with the power contact channels extending along channel axes, the power wire openings configured to receive poke-in power wires, the connector housing including signal contact channels extending along signal channel axes and signal wire openings at the bottom associated with the signal contact channels configured to receive poke-in signal wires;

twist-lock power contacts received in the power contact channels, the twist-lock power contacts having rotate-to-mate interfaces at mating ends of the twist-lock power contacts configured to be connected to the sensor power contacts; the twist-lock power contacts including wire termination pads at terminating ends of the twist-lock power contacts extending parallel to the channel axes and configured to be electrically connected to the poke-in power wires when poked into the power wire openings;

power contact wire pushers in the connector housing, the power contact wire pushers having spring beams extending transverse to the channel axes to distal ends, the distal ends of the spring beams facing the wire terminal pads and configured to engage the poke-in power wires to mechanically and electrically connect the poke-in power wires to the wire termination pads;

signal contacts received in the signal contact channels, the signal contacts having mating interfaces at mating ends of the signal contacts configured to be connected to sensor signal contacts of the sensor module, the signal contacts including wire termination pads at terminating ends of the signal contacts extending parallel to the signal channel axes and configured to be electrically connected to the poke-in signal wires when poked into the signal wire openings; and signal contact wire pushers in the connector housing, the signal contact wire pushers having spring beams configured to engage the poke-in signal wires to mechanically and electrically connect the poke-in signal wires to the wire termination pads of the signal contacts.

2. The twist lock receptacle assembly of claim 1, wherein the spring beams are releasable from the poke-in power wires.

3. The twist lock receptacle assembly of claim 1, wherein the connector housing is configured to be coupled to a fixture housing of a light fixture prior to connection of the poke-in power wires to the wire termination pads of the twist lock power contacts.

4. The twist lock receptacle assembly of claim 1, wherein the power contact channels receive the sensor power contacts prior to the power wire openings receiving the poke-in power wires.

5. The twist lock receptacle assembly of claim 1, wherein the twist lock power contacts include mating beams forming a socket at the mating ends of the twist lock power contacts.

6. The twist lock receptacle assembly of claim 5, wherein the sockets are curved along arcuate paths.

7. The twist lock receptacle assembly of claim 1, wherein the wire termination pads include wire locating elements extending from the wire termination pads to locate the poke-in power wires relative to the spring beams.

8. The twist lock receptacle assembly of claim 1, wherein the power contact wire pushers are separate and discrete from the twist lock power contacts.

9. The twist lock receptacle assembly of claim 1, wherein the power contact wire pushers are integral with the twist lock power contacts, the power contact wire pushers being electrically connected to the poke-in power wires to electrically connect the poke-in power wires and the mating ends of the twist lock power contacts.

10. The twist lock receptacle assembly of claim 1, wherein the connector housing includes rear pockets adjacent the power contact channels, the rear pockets receiving the power contact wire pushers to position the power contact wire pushers at the power contact channels to interface with the poke-in power wires.

11. The twist lock receptacle assembly of claim 1, wherein the power contact wire pushers are manufactured from a different material from the twist lock power contacts.

12. The twist lock receptacle assembly of claim 1, wherein the connector housing includes release openings adjacent the power contact channels configured to receive a release tool to release the spring beams from the poke-in power wires and allow removal of the poke-in power wires from the power wire openings.

13. The twist lock receptacle assembly of claim 1, wherein the connector housing includes a base and a rear housing, the base including the power contact channels and holding the twist lock power contacts and the power contact wire pushers, the rear housing including the power wire openings.

14. The twist lock receptacle assembly of claim 1, wherein the connector housing is cylindrical having a central axis, the twist lock power contacts arranged circumferentially around the central axis.

15. A twist lock receptacle assembly comprising:

a connector housing having a sidewall between a top and a bottom of the connector housing, the connector housing having power contact channels open at the top to receive sensor power contacts of a sensor module, the connector housing including power wire openings at the bottom associated with the power contact channels, the power wire openings configured to receive poke-in power wires, the connector housing having signal contact channels, the connector housing including signal wire openings at the bottom associated with the signal contact channels, the signal wire openings configured to receive poke-in signal wires;

twist-lock power contacts received in the power contact channels, the twist-lock power contacts having rotate-to-mate interfaces at mating ends of the twist-lock power contacts configured to be connected to the sensor power contacts; the twist-lock power contacts including wire termination pads at terminating ends of the twist-lock power contacts configured to be electrically connected to the poke-in power wires when poked into the power wire openings;

power contact wire pushers in the connector housing, the power contact wire pushers having spring beams configured to engage the poke-in power wires to mechanically and electrically connect the poke-in power wires to the wire termination pads of the poke-in power contacts;

signal contacts received in the signal contact channels, the signal contacts having mating interfaces at mating ends of the signal contacts configured to be connected to sensor signal contacts of the sensor module, the signal contacts including wire termination pads at terminating ends of the signal contacts configured to be electrically connected to the poke-in signal wires when poked into the signal wire openings;

signal contact wire pushers in the connector housing, the signal contact wire pushers having spring beams configured to engage the poke-in signal wires to mechanically and electrically connect the poke-in signal wires to the wire termination pads of the signal contacts.

16. The twist lock receptacle assembly of claim 15, wherein the spring beams of the power contact pushers are releasable from the poke-in power wires and the spring beams of the signal contact pushers are releasable from the poke-in signal wires.

17. The twist lock receptacle assembly of claim 15, wherein the connector housing is configured to be coupled to a fixture housing of a light fixture prior to connection of the poke-in power wires to the wire termination pads of the twist lock power contacts and prior to connection of the poke-in signal wires to the wire termination pads of the signal contacts.

18. The twist lock receptacle assembly of claim 15, wherein the power contact channels receive the sensor power contacts prior to the power wire openings receiving the poke-in power wires.

19. A light control module comprising:

a sensor module having a sensor module housing and a sensor element held by the sensor module housing for sensing an environmental characteristic exterior of the sensor module, the sensor module including twist-lock power contacts held by the sensor module housing and extending from a mating interface of the sensor module housing, the connector housing including signal contact channels and signal wire openings at the bottom associated with the signal contact channels configured to receive poke-in signal wires; and a twist lock receptacle assembly coupled to the sensor module at the mating interface, the twist lock receptacle assembly comprising:

a connector housing having a sidewall between a top and a bottom of the connector housing, the connector housing having power contact channels open at the top to receive sensor power contacts of a sensor module, the connector housing including power wire openings at the bottom associated with the power contact channels extending along channel axes, the power wire openings configured to receive poke-in power wires;

twist-lock power contacts received in the power contact channels, the twist-lock power contacts having rotate-to-mate interfaces at mating ends of the twist-lock power contacts connected to the sensor power contacts; the twist-lock power contacts including wire termination pads at terminating ends of the twist-lock power contacts extending parallel to the channel axes and configured to be electrically connected to the poke-in power wires when poked into the power wire openings;

power contact wire pushers in the connector housing, the power contact wire pushers having spring beams extending transverse to the channel axes to distal ends, the distal ends of the spring beams facing the wire terminal pads and configured to engage the poke-in power wires to mechanically and electrically connect the poke-in power wires to the wire termination pads;

signal contacts received in the signal contact channels, the signal contacts having mating interfaces at mating ends of the signal contacts configured to be connected to sensor signal contacts of the sensor module, the signal contacts including wire termination pads at terminating ends of the signal contacts configured to be electrically connected to the poke-in signal wires when poked into the signal wire openings; and signal contact wire pushers in the connector housing, the signal contact wire pushers having spring beams configured to engage the poke-in signal wires to mechanically and electrically connect the poke-in signal wires to the wire termination pads of the signal contacts.

* * * * *